(12) United States Patent
Griffin et al.

(10) Patent No.: US 10,481,672 B1
(45) Date of Patent: Nov. 19, 2019

(54) LOW-POWER MEMS WAKEUP SYSTEM

(71) Applicant: National Technology & Engineering Solutions of Sandia, LLC, Albuquerque, NM (US)

(72) Inventors: Benjamin Griffin, Arlington, VA (US); Robert William Reger, Albuquerque, NM (US); Sean Yen, Albuquerque, NM (US); Bryson Barney, Provo, UT (US); Andrew Ian Young, Albuquerque, NM (US); Travis Ryan Young, Albuquerque, NM (US); Michael Wiwi, Albuquerque, NM (US); Michael David Henry, Albuquerque, NM (US); Brian D. Homeijer, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/274,455

(22) Filed: Feb. 13, 2019

Related U.S. Application Data (60) Provisional application No. 62/637,150, filed on Mar. 1, 2018.

(51) Int. Cl.
| | |
|---|---|
| *G06F 1/3234* | (2019.01) |
| *G06F 1/3287* | (2019.01) |
| *H01L 41/18* | (2006.01) |
| *H04R 3/00* | (2006.01) |
| *H04R 17/02* | (2006.01) |

(52) U.S. Cl.
CPC ............ *G06F 1/325* (2013.01); *G06F 1/3287* (2013.01); *H01L 41/18* (2013.01); *H04R 3/002* (2013.01); *H04R 17/02* (2013.01); *H04R 2201/003* (2013.01)

(58) Field of Classification Search
CPC ....... G06F 1/325; G06F 1/3287; H01L 41/18; H04R 3/002; H04R 17/02; H04R 2201/003
See application file for complete search history.

(56) References Cited

PUBLICATIONS

Bryan, G. et al., "Back Cavity Effects on Passive Resonant Piezoelectric Microphone," Undergraduate Honors These, University of New Mexico, Department of Mechanical Engineering, SAND2016-4554T, 24 pages.
Griffin, B. A., "Piezoelectric MEMS Based on Aluminum Nitride," SAND2015-0266C, Sandia National Laboratories, Jan. 22, 2014, 38 pages.
Griffin, B. A. et al., "Development of an Aluminum Nitride-Silicon Carbide Material Set for High Temperature Sensor Applications," SAND2015-8412C, Sandia National Laboratories, Sep. 29, 2015, 43 pages.
Griffin, B. A. et al., "Near Zero Power RF and Sensor Operations (N-ZERO)," N-Zero Program Kickoff Meeting, Arlington, VA, Oct. 13-14, 2015, SAND2015-8818PE, 34 pages.

(Continued)

*Primary Examiner* — Mark Fischer
(74) *Attorney, Agent, or Firm* — Martin I. Finston (57) ABSTRACT

There is provided a near-zero-power wakeup system in which a MEMS sensor for mechanical or acoustic signals is coupled to a very-low-power complementary metal oxide semiconductor (CMOS) application-specific integrated circuit (ASIC). Power consumption can be minimized by operating the ASIC with sub-threshold gate voltages.

13 Claims, 12 Drawing Sheets

(56) References Cited

PUBLICATIONS

Griffin, B., "Aluminum Nitride Based MEMS: Sensors, Actuators, and Resonators," 5th International Workshop on Piezoelectric MEMS (PiezoMEMS 2016), Grenoble, France, May 24-25, 2016, 30 pages.

Reger, R. W. et al., "Near-Zero Power Accelerometer Wakeup System," Sensors Conference 2017, SAND2017-11619C, Oct. 30, 2017, 39 pages.

Reger, R. W. et al., "Near-Zero Power Accelerometer Wakeup System," 2017 IEEE Sensors, Oct. 29, 1-Nov. 1, 2017, Glasgow, UK, 3 pages.

Reger, R. W. et al., "Aluminum Nitride Piezoelectric Microphones as Zero-Power Passive Acoustic Filters," 2017 19th International Conference on Solid-State Sensors, Actuators and Microsystems (TRANSDUCERS), Jun. 18-22, Kaohsiung, Taiwan, 4 pages.

LOW-POWER MEMS WAKEUP SYSTEM

CROSS-REFERENCE TO RELATED APPLICATION

This application claims the benefit of priority to U.S. Provisional Patent Application No. 62/637,150, filed Mar. 1, 2018 under the title, "Low-Power MEMS Wakeup System", the entire contents of which are incorporated herein by reference.

ACKNOWLEDGEMENT OF GOVERNMENT SUPPORT

This invention was made with Government support under Contract No. DE-NA0003525 awarded by the United States Department of Energy/National Nuclear Security Administration. The U.S. Government has certain rights in the invention.

FIELD OF THE INVENTION

The invention relates to microelectromechanical systems (MEMS), and more particularly to MEMS devices that employ piezoelectric transduction to detect vibrational and acoustic signals.

ART BACKGROUND

There has long been a need for a very-low-power wakeup system that can be used in wireless sensor networks for secure asset and site protection. In other contexts as well, there has been a need for very-low power devices suitable for the long-term monitoring of infrequent events. In the medical field, for example, a very-low-power pulse monitor would be useful for detecting incidents of cardiac arrhythmia.

Piezoelectric detectors based, e.g., on thin-film aluminum nitride (AlN) have shown promise for sensing mechanical deformations without significant power consumption (other than for signal conditioning). However, there remains a need for highly sensitive and frequency-selective detectors suitable for long-term monitoring. Until now, the potential of piezoelectric detectors for such applications has not been fully exploited.

SUMMARY OF THE INVENTION

We have developed a near-zero-power wakeup system in which a MEMS sensor for mechanical or acoustic signals is coupled to a very-low-power complementary metal oxide semiconductor (CMOS) application-specific integrated circuit (ASIC). Power consumption can be minimized by operating the ASIC with sub-threshold gate voltages and long channel transistors. We believe that with these techniques, power consumption can be as low as 10 nW or even less. This can lead to new wakeup sensors that stay constantly alert while consuming power at levels comparable to the leakage of the best known batteries.

The MEMS sensor is an AlN-based resonant microphone or accelerometer, which detects acoustic or vibratory signals, respectively. Unlike traditional microphones and accelerometers, which are operated in a flat band situated well below the resonant frequency of the device, our MEMS sensors are intentionally operated near resonance. This provides zero-power mechanical filtering and amplification for frequency signature detection.

In particular, resonant operation offers zero-power rejection of undesirable background signals in favor of specific frequencies of interest such as those characteristic of a specific target.

The sensor outputs are routed to a CMOS comparator-latch circuit. The comparator component of the circuit compares the sensor output to a threshold voltage. The latch component produces a sustained wakeup signal from the comparator output. In some implementations, the latch component is realized by adding a positive feedback loop to the comparator, thereby obviating a separate latch stage.

Combined, the MEMS sensor and CMOS ASIC are used to create a very-low-power wakeup system that can provide a voltage output, exemplarily a one-volt output, when the sought-for frequency content is present in the environment.

In implementations of the wake-up system, the threshold of the CMOS comparator is adjustable relative to the output signal level from the MEMS device. Accordingly, the system can be tuned as desired to either increase the probability that a target signal is detected, or reduce the probability of a false alarm.

DETAILED DESCRIPTION

Our MEMS sensor includes a mass element suspended from a frame by suspension members referred to here as flexures, or alternatively, as tethers. In a sensor for operation as a microphone, the mass element is a diaphragm suspended by the flexures between the ambient atmosphere and a back cavity. Acoustic pressure is integrated over the face of the diaphragm to create a force. Accordingly, the diaphragm, under excitation by an incident acoustic field, will vibrate in the out-of-plane direction, i.e. along the axis perpendicular to its front surface.

In a sensor for operation as an accelerometer, the mass element is a proof mass element suspended by the flexures so that it can oscillate along its in-plane axis, i.e., an axis parallel to its front surface.

The flexures are composite elements consisting, in example embodiments, of single crystal silicon overlain by a layer of AlN. Aluminum electrodes pattern the flexures to preferentially collect piezoelectrically generated charge for the designed vibration mode of the sensors. The output voltage is generated piezoelectrically by strain in the flexures.

Our currently preferred structural material is single-crystal silicon because it is stress neutral and because it can be doped to create a bottom electrode. A possible alternative material is polysilicon. However, a separate electrode would be needed, or a buffer layer to promote the growth of well-oriented AlN. With use of a separate bottom electrode, other structural materials could be substituted. However, there would be a need for special attention to fabrication-induced residual stress in the structural layer.

AlN, along with aluminum-alloy nitrides such as scandium aluminum nitride, is the currently preferred piezoelectric medium. However, other piezoelectric materials such as lead zirconate titanate (PZT) and zinc oxide (ZnO) may be suitable alternatives in the present context, and they are not excluded from the scope of the invention.

AlN is believed to be advantageous because, even though its parallel ($d_{33}$) and transverse ($d_{31}$) piezoelectric coefficients are fifty-fold to one hundred-fold less than those of PZT, the low permittivity of AlN allows for a higher sensitivity coefficient $g_{31}$. (For AlN, $g_{31}$=0.027 V/m/Pa, whereas for PZT it is only 0.018 V/m/Pa.) This allows for larger open circuit voltages at the same input pressure.

AlN has the further advantages that it can maintain a larger signal-to-noise ratio than PZT, and it is fully CMOS compatible, so that on-chip integration with electronics is feasible and compatible with fabrication in CMOS foundries.

In our microphone designs, the outlines of the flexures are partially defined by slots in the silicon membrane that we refer to as vents. The vents provide a passage for air to be exchanged between the back cavity and the external atmosphere so that the internal and external pressures are equilibrated under quiescent conditions. The resistance to airflow through the slots contributes a damping term that affects the frequency response of the microphone. As discussed below, the slot dimensions can be optimized together with other design parameters for a desired frequency response.

Figure 1:
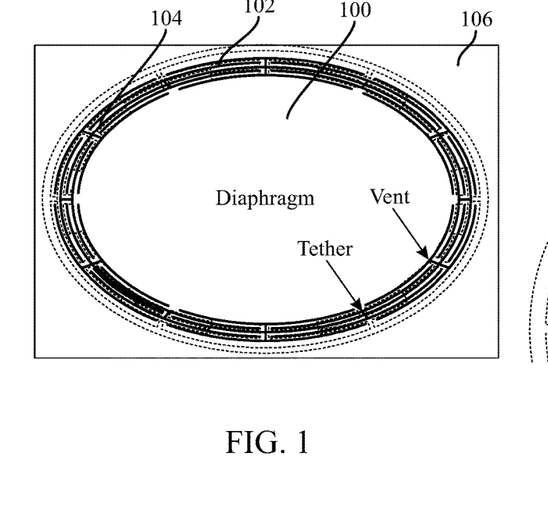
FIG. 1 is a plan view of a MEMS microphone diaphragm as described here.

FIG. 1 is a plan view of a MEMS microphone diaphragm 100 as discussed above. The flexures 102 and the vents 104 are visible in the figure. The diaphragm is in the center of the figure, and the frame 106 surrounds the diaphragm outside the circular perimeter defined by the flexures. Without limitation, example radii of diaphragms that we tested are 360 μm, 480 μm, 580 μm, and 680 μm.

Figure 2:
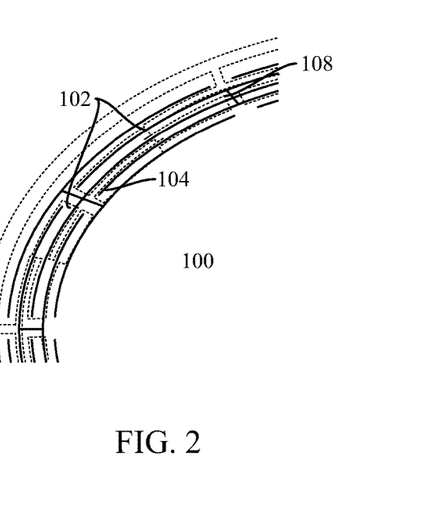
FIG. 2 is a magnified detail of FIG. 1, showing two flexures and also showing the gap that forms the vent between them.

FIG. 2 is a magnified detail of FIG. 1, showing two flexures 102 and also showing the vent 104 that is included between them. It will be seen that each flexure is double folded in the sense that it switches back so as to describe two complete U-shapes linked in series by a short bar 108 that in this geometry is aligned radially. The locations where the tethers attach to the frame and to the diaphragm are referred to as "anchors".

Although not visible in FIGS. 1 and 2, the diaphragm has a farther extent in the thickness dimension (i.e., downward below the plane of the page on which the figures are displayed) than the tethers. The thickness of the diaphragm includes not only the AlN layer, but also the silicon device layer, the oxide layer, and some of the underlying bulk silicon. By contrast, the thickness of the tethers includes only the AlN and silicon device layers. This is more clearly evident in FIG. 3.

It should be noted that both the radially-directed slots between flexures, and the circumferentially-directed slots that define edges of the flexures, are considered to be vents, as they have similar effects on the mechanics of the microphone response.

The total number of switchbacks in a flexure is not critical. For example, we tested designs with as few as two switchbacks and as many as four. Increasing the number of switchbacks will increase the compliance within a smaller arc length, but it will also increase the vent perimeter, thus decreasing its resistance. The number of switchbacks will also increase the linear operating range of the microphone for a given stiffness.

Figure 3:
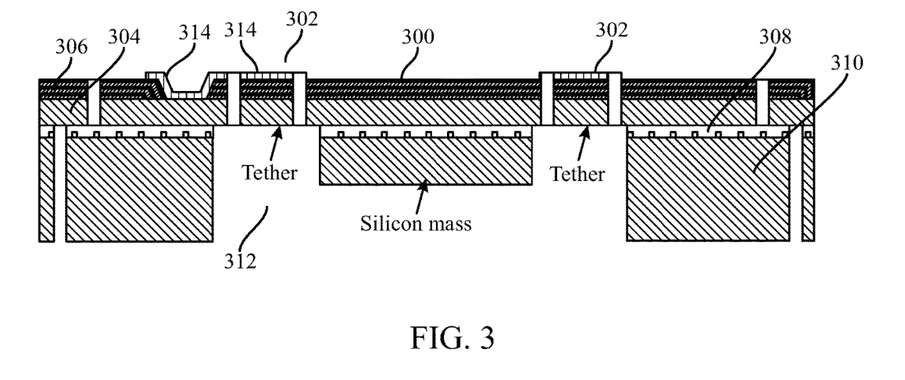
FIG. 3 is a notional cross-sectional diagram of the microphone of FIGS. 1 and 2.

FIG. 3 is a notional cross-sectional diagram of the microphone of FIGS. 1 and 2. As seen in the figure, the diaphragm 300 and flexures 302 are defined in a suspended film composed of the silicon device layer 304, overlain by AlN 306. The silicon device layer is supported by a buried oxide (BOX) layer 308 atop the bulk silicon wafer 310, both of which have been etched away to define the back cavity 312 of the microphone.

As shown in the figure, portions of the BOX and handle have been left attached to the back side of the diaphragm for mass loading to tune the frequency response of the microphone. Metal electrodes 314 are deposited on the front side and back side of the AlN layer. In some cases, instead of providing back-side metal electrodes, it will be adequate to heavily dope the silicon underneath the AlN layer to provide contact to the backside electrode. Otherwise, a separate electrode material needs to be incorporated.

Figure 4A:
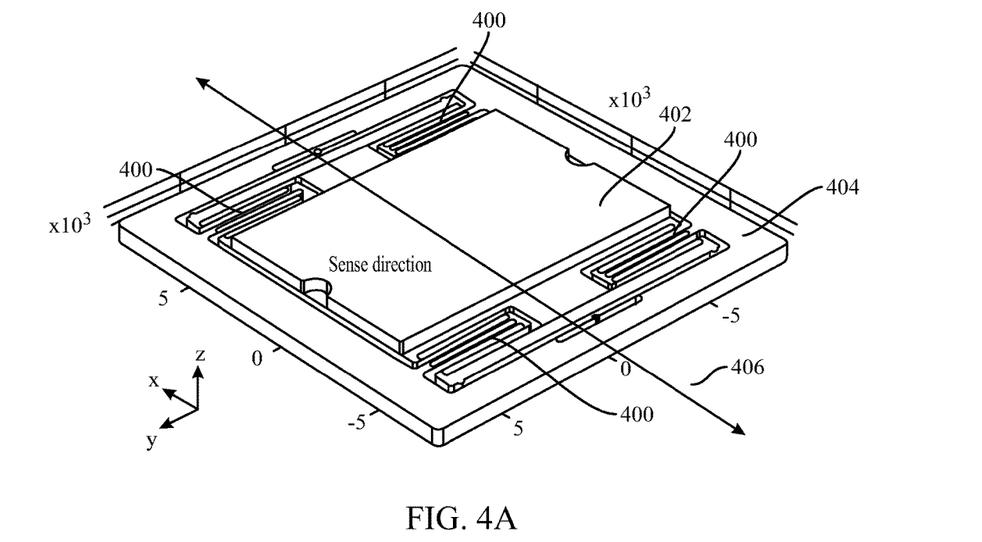
FIG. 4A is a plan view of a MEMS accelerometer sensor as described here.

FIG. 4A is a plan view of a MEMS accelerometer sensor as discussed above. Four flexures 400 are visible in the figure; they connect the suspended mass 402 to the frame 404. The proof mass is suspended so as to be able to vibrate in a sense direction along an in-plane axis 406. The flexures in the illustrated example are double folded, like the microphone flexures described above.

However, the accelerometer flexures differ from the microphone flexures in the orientation of the deflection axis. On close inspection of FIG. 4A (and FIG. 4B, discussed below), it will be seen that each flexure includes two double-beam pairs 408A, 408B that are connected in parallel by a crossbar 410. As each two-beam pair contains a single fold, we refer to this parallel-connected arrangement as an arrangement of double-folded beams. The double-folded arrangement that is depicted has the same stiffness as a single beam, but it has a much greater linear operating range.

Figure 4B:
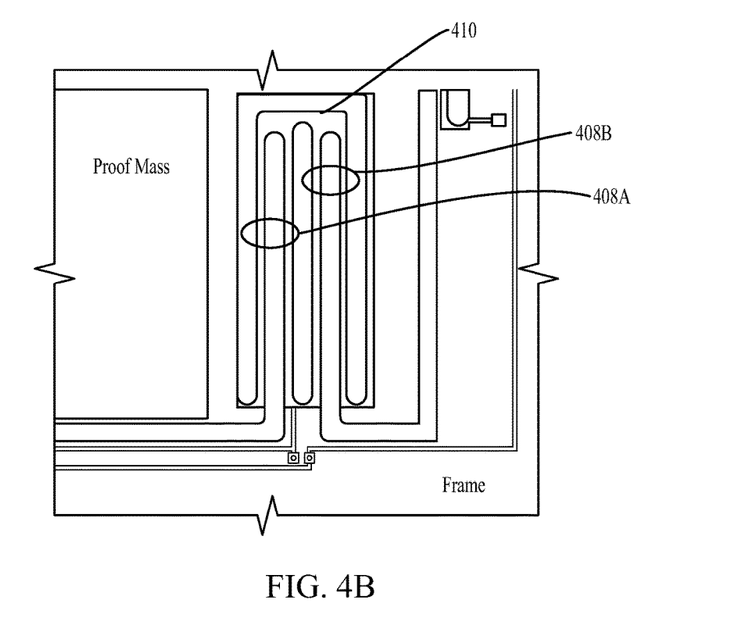
FIG. 4B is a top view of a detail of FIG. 4A.

FIG. 4B is a top-down view, showing a detail of the bottom corner of FIG. 4A. The trenches that define the flexures are seen as the dark spaces between the beams in the figure.

Figure 4C:
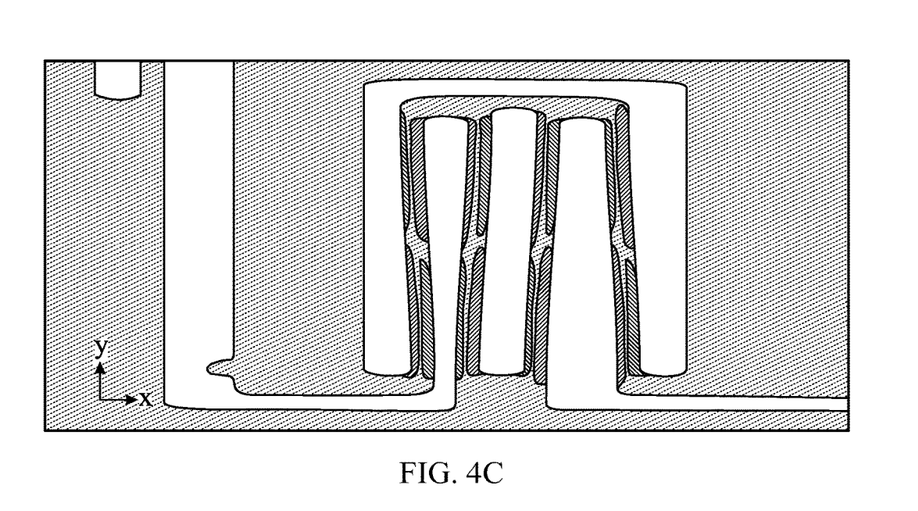
FIG. 4C is a view of a flexure, similar to the flexure of FIG. 4B, in a simulation showing the stress field of the flexure under displacement. The horizontal scale of the figure is grossly exaggerated for ease of inspection.

FIG. 4C is a view of a flexure, similar to the flexure of FIG. 4B, in a simulation showing the stress field of the flexure under displacement. For ease of examination, the horizontal scale of the figure has been grossly exaggerated. Shading is used in the figure to indicate the magnitude of the component of the stress tensor directed parallel to the beams. As those skilled in the art will understand from the figure, judicious placement of the electrodes is desirable so that only a single polarity of signal is collected at any given time.

Figure 5:
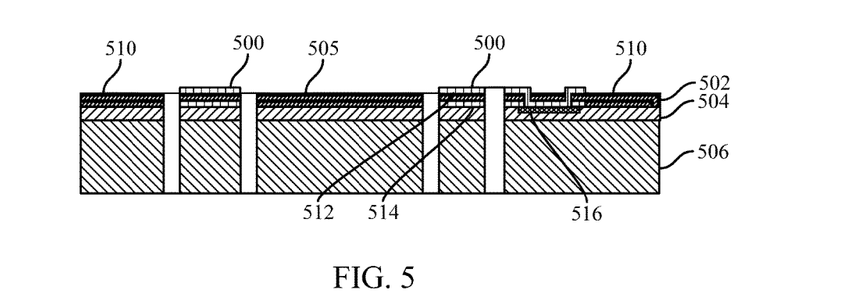
FIG. 5 is a notional cross-sectional diagram of a portion of the accelerometer sensor of FIG. 4A.

FIG. 5 is a notional cross-sectional diagram of a portion of the accelerometer sensor of FIG. 4A. The flexures 500 are visible in the diagram, as are the AlN 502 and single-crystal silicon 504 of the proof mass 505, as well as an oxide layer 506 that was added over the bulk silicon (not shown). (Bulk silicon, not an SOI wafer, was used for fabrication.) The frame 510 is also seen surrounding the proof mass and flexures. In the implementation shown in the figure, both the top 512 and bottom 514 electrodes of the AlN layer are deposited metal.

Also visible in the figure is a tungsten plug 516, extending into the oxide (not shown in the figure), that was used as an etch stop for etching through the AlN.

Although the top and bottom metal electrodes appear to be shorted together in the figure, that is misleading. What is shown is a connection between the bottom electrode and an isolated electrode defined in the top metal for a probe. That portion of the top metal is not connected to the top electrode of the device.

In design studies, we were able to shift the accelerometer resonance to very low frequencies by increasing the proof mass and decreasing the flexure stiffness. The mass can be increased, for example, by adding a macromachined, high-density plug such as a tungsten plug.

Conventional flat-band accelerometers for, e.g., applications in cellphones and automobiles have typical sensitivities on the order of 0.1 V/g over a range of several kilohertz. In our new devices, by contrast, we demonstrated resonant sensitivities as high as 450 V/g. We also demonstrated quality factors up to 12,500 at resonant frequencies as low as 43 Hz.

Figure 6:
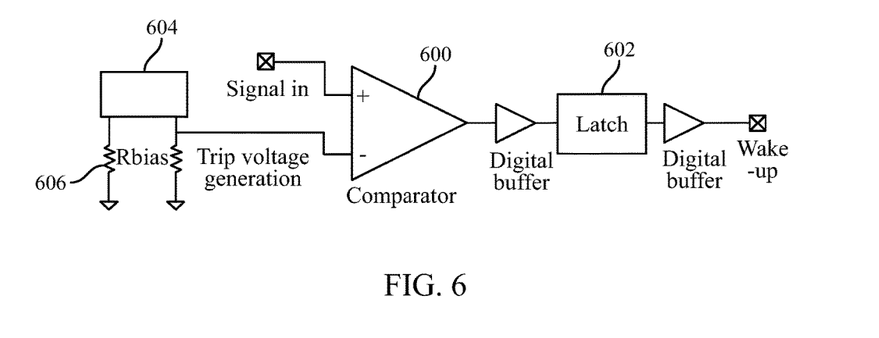
FIG. 6 is a notional schematic diagram of the CMOS ASIC portion of the system described here.

FIG. 6 is a notional schematic diagram of the CMOS ASIC portion of the wakeup system. As seen in the figure, the comparator 600 generates an output voltage that is provided as input to the latching circuit 602 whenever the input signal received from the sensor exceeds the trip voltage set by the bias circuit. As shown, the bias circuit includes the bias cell 604 and the bias resistance 606.

As those skilled in the art will understand, a bias cell is a simple transistor circuit connected to a voltage supply. It sets a current to a specified value, which in our case is typically 1 nA. The current is dropped through a bias resistor to set an operating point such as the threshold voltage for the comparator. More generally, a bias cell can set the currents and operating points throughout a circuit. An example is the voltage levels designated "BP" in the circuit diagrams presented here, which are the DC values around which the signals operate.

The latching circuit 602 (shown in the diagram as buffered by digital buffer circuits on its input and output ends) maintains the output voltage until it is reset. The latch has a reset input, which is not shown in FIG. 6, but which can be seen in FIG. 18, below. When the reset input goes to VDD (in our example, 1 V), the feedback within the latch circuit (see FIG. 18) throws the latch to the reset state (output=0).

Our designs for the CMOS circuit consumed as little as 5.25 nW of power. This was achieved by combining long-channel devices, subthreshold biasing, reduced supply voltages, and a self-latching comparator. By combining zero-power MEMS sensors with such a near-zero-power CMOS ASIC, we were able to create an "asleep, but always alert" wakeup system that draws less power (while inactive and active) than the leakage of a typical commercial battery.

In an example, the comparator consists of a differential pair with a current mirror feeding into a common source amplifier; each branch is designed to consume 1 nW of power. The comparator output connects to a latch. The latch is a cross-coupled design requiring 1 nA of static current.

The low current is accomplished by using long channel devices, sub-threshold biasing, and current starvation, and by decreasing the supply voltage. The bias cell is a bootstrap configuration with a startup circuit that consumes no power after the initial startup. The trip point voltage is generated by mirroring a 1 nA current through a resistor, with a bypass capacitor in parallel to reduce noise.

Further details are provided in connection with the specific embodiments provided as non-limiting examples below.

Example 1: Piezoelectric Microphonic Detector

Figure 7:
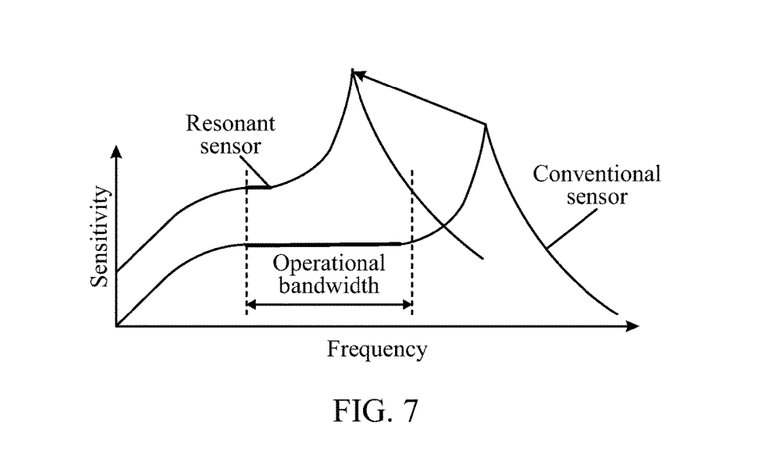
FIG. 7 is a graph of frequency response showing the relationship between the operating band of a conventional microphone and the resonant frequency of the microphone. For comparison, the same relationship is also shown for a resonant microphone of the kind described here.

In general, a conventional microphone would be designed to have a strong flat-band response over a broad operational bandwidth, as shown in FIG. 7. By contrast, we have designed our resonant microphone to have a resonance peak that falls within the operational bandwidth at a selected frequency of interest, as also shown in the figure. This leads to passive filtering of noise as well as amplification of the desired signal.

Figure 8:
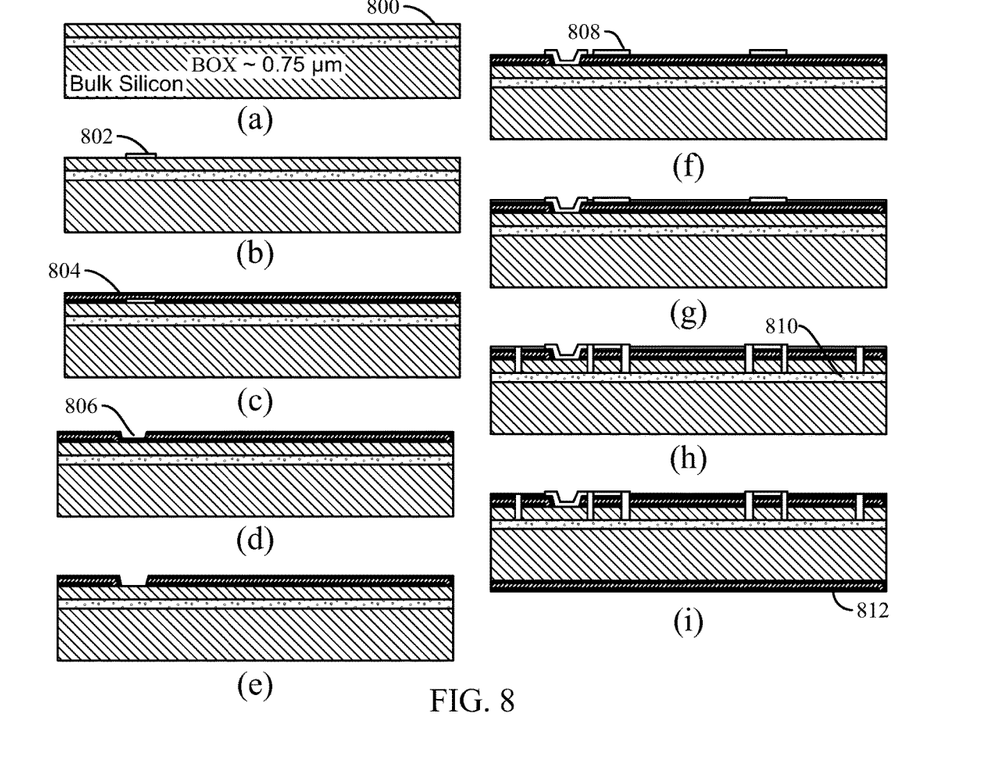
FIG. 8 illustrates various stages in an example front-end fabrication process for a resonant microphone.

The front-end fabrication process for our microphone will now be described with reference to FIG. 8

(a) The process begins with a silicon on insulator (SOI) wafer with a highly doped (1 mΩ-cm resistivity) silicon device layer 800, which will serve as the bottom electrode in the piezoelectric film stack. (b) A thin 50-nm oxide 802 is deposited to serve as an AlN via etch stop, and it is patterned into mesas at the via locations. (c) A 750-nm AlN film 804 is formed by reactive sputter deposition. (d) The AlN is etched to form a via 806 stopping on the oxide mesas. (e) Oxide via stops are etched using a buffered oxide etch. (f) Top metal electrode 808, consisting of 700 nm of aluminum (with 0.5% copper) and 50 nm of titanium nitride, is deposited and (g) patterned. (h) An oxide hard mask is patterned and the AlN and silicon device layer are etched, landing in the buried oxide (BOX) 810. (i) An oxide hard mask is deposited on the wafer backside 812 for back end of line processing.

Figure 9:
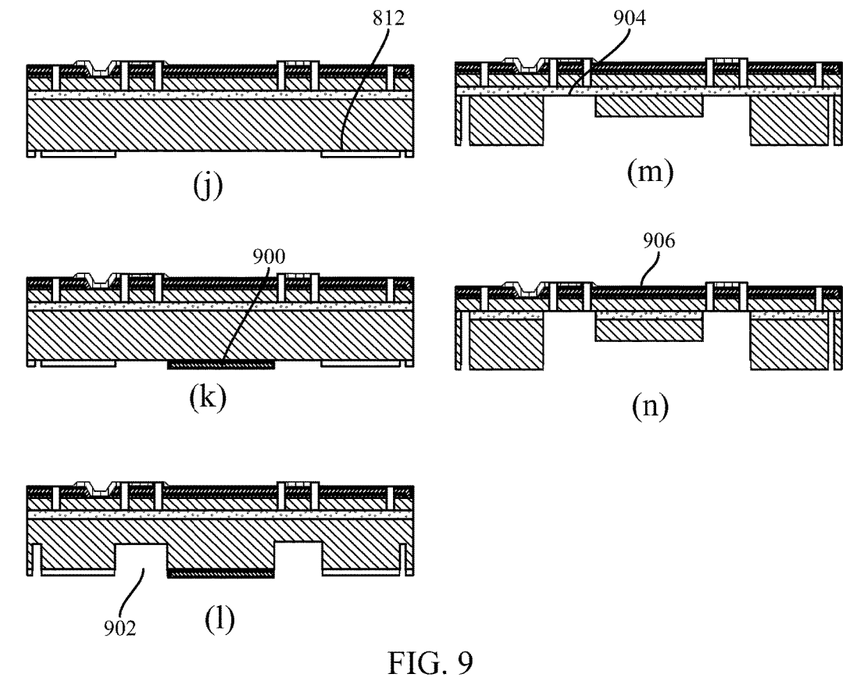
FIG. 9 illustrates various stages in an example back-end fabrication process for a resonant microphone.

The back-end process will now be described with reference to FIG. 9.

(j) The oxide hard mask 812 on the back of the wafer is patterned. (k) The backside of the wafer is re-patterned with photoresist to form a nested mask 900 used to create a thick diaphragm for structural stiffness and mass. (l) Deep reactive ion etch (DRIE) is performed on the backside to form the silicon diaphragm depth 902. (m) The nested photoresist mask is removed and the DRIE is continued until landing on the BOX 904. (n) A hydrofluoric acid etch releases the diaphragm 906.

The behavior of the detector can be modeled with an equivalent circuit. The equivalent circuit model illustrated in FIG. 10 will serve as a basis for the discussion below.

Figure 10:
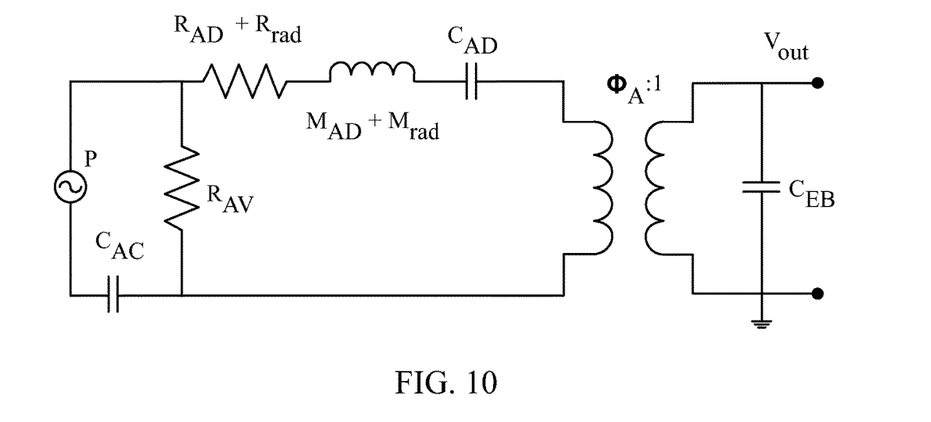
FIG. 10 is an equivalent circuit that models a microphonic sensor of the kind described here.

The symbols in FIG. 10 have the following meanings:

$C_{AD}$=compliance of the flexures (as represented by a notional spring).

$M_{AD}$=mass of the diaphragm.

$R_{AD}$=mechanical loss due to anchor losses, thermoelastic effects, and the like.

$M_{rad}$=mass term equivalent to the impedance due to loading of the fluid surrounding the diaphragm.

$R_{rad}$=a resistance term equivalent to the damping due to re-radiation of acoustic waves into the fluid.

$R_{AV}$=a resistance term equivalent to the damping due to the acoustic resistance of the vents defined by the gaps around the flexures.

$C_{AC}$=compliance of the back cavity as represented by an equivalent spring. For a back cavity of sub-wavelength dimensions, the equivalent spring compliance is estimated as $v/[\rho_0(c_0)^2]$, where $v$ is the volume of the back cavity, $\rho_0$ is the density of air, and $c_0$ is the speed of sound in air.

$C_{EB}$=the electrical impedance of the system, which is the capacitance created by the AlN dielectric between the top and bottom electrodes, neglecting parasitic capacitance.

$\phi_A$=the transduction factor for coupling from the acoustic energy domain to the electrical energy domain, represented notionally by a transformer.

To a first approximation, the diaphragm mass and flexure compliance govern the resonant frequency $f_{res}$ of the microphone according to the expression, $$f_{res}=(1/2\pi)(M_{AD}C_{AD})^{-1/2}.$$

The quality factor Q of the microphone also depends on the diaphragm mass and flexure compliance. To a first approximation, neglecting the vent resistance and the compliance of the back cavity, the quality factor is estimated according to the expression, $$Q \approx (1/(R_{AD}+R_{rad}))(M_{AD}/C_{AD})^{1/2}.$$

Examination of the two equations above shows that increasing the diaphragm mass while maintaining a constant flexure compliance will tend to bring the resonant frequency down while increasing the quality factor. Hence, the resonance can be lowered into the operational bandwidth while maintaining a high Q. It should be noted, however, that added diaphragm mass can increase the sensitivity of the device to environmental vibrations.

Turning now to the vent resistance $R_{AV}$ and the back cavity compliance $C_{AC}$, it will be understood from the equivalent circuit of FIG. 10 that the combined effect of these two parameters is to create a high-pass filter that determines the cut-on frequency of the microphone. The cut-on frequency $f_{co}$ as determined by these factors is given by the expression, $$f_{co}=1/(2\pi R_{AV}C_{AV}).$$

In the context of conventional microphones, the cut-on frequency generally corresponds to the lower bound of the operational bandwidth. With all other factors held constant, down-shifting the resonant peak of a conventional microphone would tend to overlap the resonant response with the roll-off created by the vent and back-cavity. This would spread (and partially suppress) the resonant response, thereby dampening the quality factor Q. However, we have found that this effect can be mitigated through appropriate design of the back-cavity volume.

That is, increasing the volume of the back cavity will increase its compliance, which tends, in turn, to lower the cut-on frequency of the high-pass filter. Concurrently, increasing the back-cavity volume will also reduce its contribution to the effective device stiffness, which tends, in turn, to reduce the resonant frequency.

Figure 11:
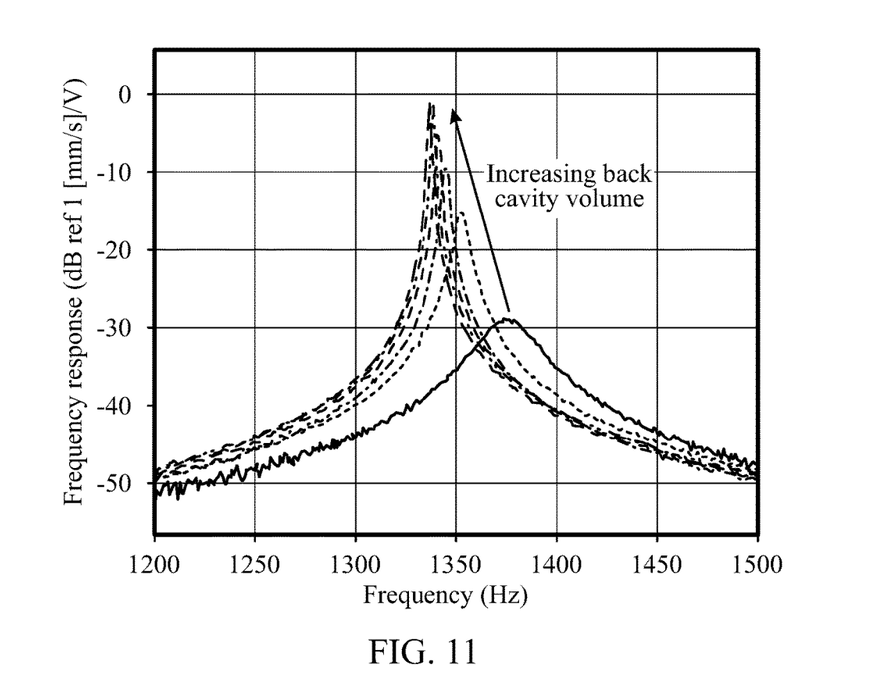
FIG. 11 is a graph of the measured frequency response of an example resonant microphone.

For example, FIG. 11 is a graph of the frequency response of a resonant microphone as measured with a laser vibrometer. A series of plots are provided, each corresponding to a different back-cavity volume. The back-cavity volume increases from the right-most to the left-most plot. It will be seen that as the back-cavity volume increases, the quality factor increases (as evidenced by the growth in height and decreasing width of the plots) while the resonant peak shifts to lower frequency.

Figure 12:
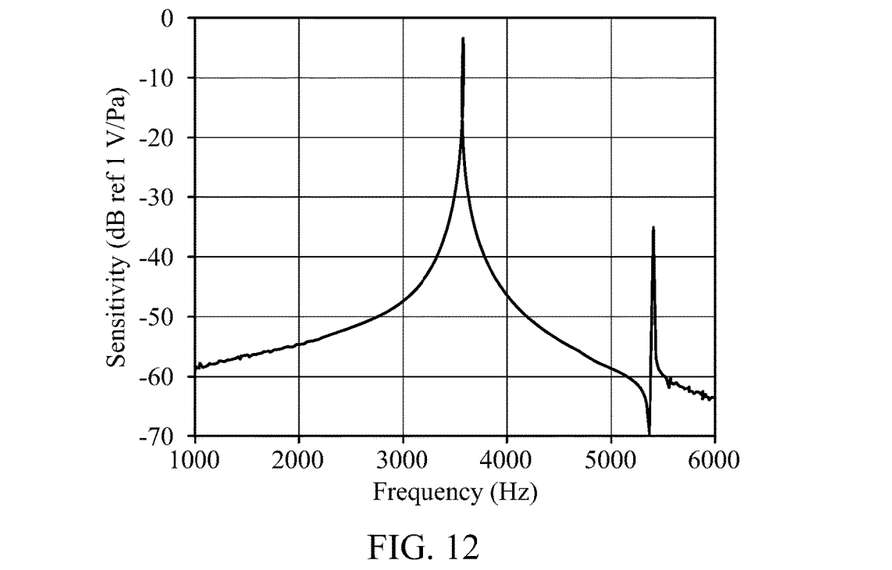
FIG. 12 is a graph of the open-circuit sensitivity of an example resonant microphone.

FIG. 12 is a graph of the open-circuit sensitivity of a selected resonant microphone that was tested in an acoustic plane-wave tube. As seen in the figure, the peak response occurred at a frequency of 3500 Hz with a sensitivity of 600 mV/Pa. A spurious peak seen near 5450 Hz is attributed to a tilting resonant mode.

In our experiments, we observed resonant frequencies ranging from 430 Hz to over 10 kHz and quality factors up to 3000. Based on these studies, we believe it would be feasible to design a microphonic detector for frequencies as low as 400 Hz or even less, and as high as 20 kHz or even more.

Example 2: Piezoelectric MEMS Accelerometer

We made and tested an accelerometer in which a tungsten proof mass was situated within a silicon frame. The frame was connected to the rest of the die by four compliant flexures of single-crystal silicon as described above. Each connection is a double-folded flexure with the equivalent mechanical stiffness of a single, fixed, guided beam. We modeled the device as a second order system. As such, the resonant frequency of the device depends on the stiffness k of the flexures and the proof mass m according to the expression, $f_{res}=(1/2\pi)(k/m)^{1/2}$.

The flexure stiffness is established during the microfabrication process. The mass, however, can be set post-fabrication. The use of a metal slug or plug is optional; for at least some applications, silicon alone provides sufficient mass, and mass can be added by other additive techniques. However, because tungsten has 8.2 times the density of silicon, it is useful for producing very low resonances.

Figure 13:
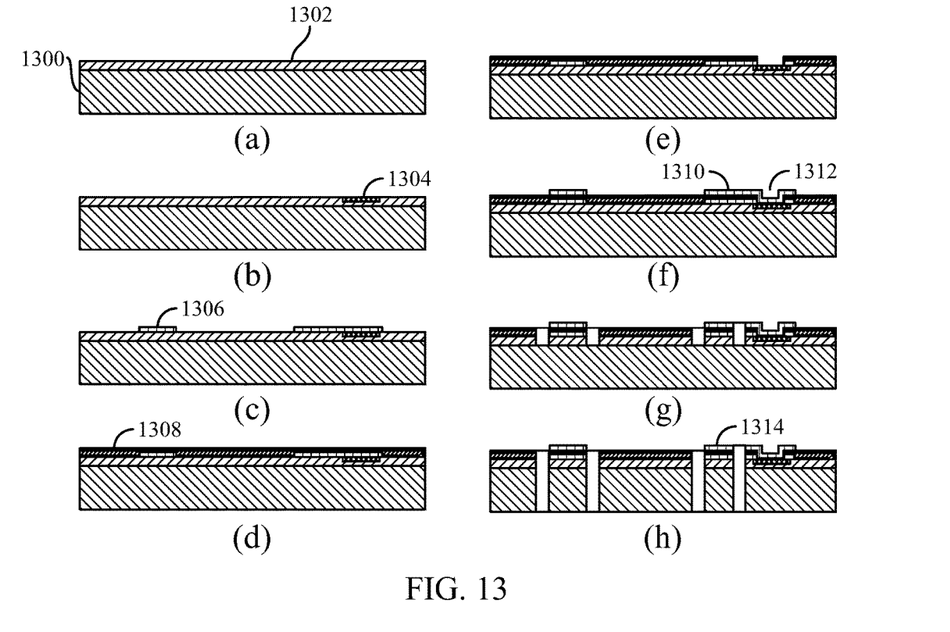
FIG. 13 illustrates various stages in an example fabrication process for an accelerometer sensor.

Our process for fabricating the accelerometer is now described with reference to FIG. 13. (a) The process begins with a silicon wafer 1300 on which one micrometer of oxide 1302 is deposited. (b) The oxide is etched and a 200 nm tungsten plug 1304 is deposited via chemical vapor deposition; the surface is them chemically-mechanically polished to the surface of the oxide. (c) The bottom metal 1306 made up of 20 nm of titanium, 50 nm of titanium nitride, and 100 nm of aluminum copper (Ti/TiN/AlCu) is then deposited and patterned. (d) 750 nm of AlN 1308 is deposited and (e) an etch is performed through the AlN to the tungsten plug. (f) The top metallization 1310 of 200 nm of AlCu is deposited and patterned making the connection through via 1312. (g) The stack is patterned down to the silicon using a thick oxide mask, and then (h) DRIE is applied to etch through the wafer to form the device flexures 1314.

The electrode metal is patterned so as to place electrodes only on portions of the tether having the same sign of stress. This is useful for maximizing the output signal. Otherwise, placement of electrodes in areas of alternating signs of stress would cause partial mutual cancellation of the signal.

Figure 14:
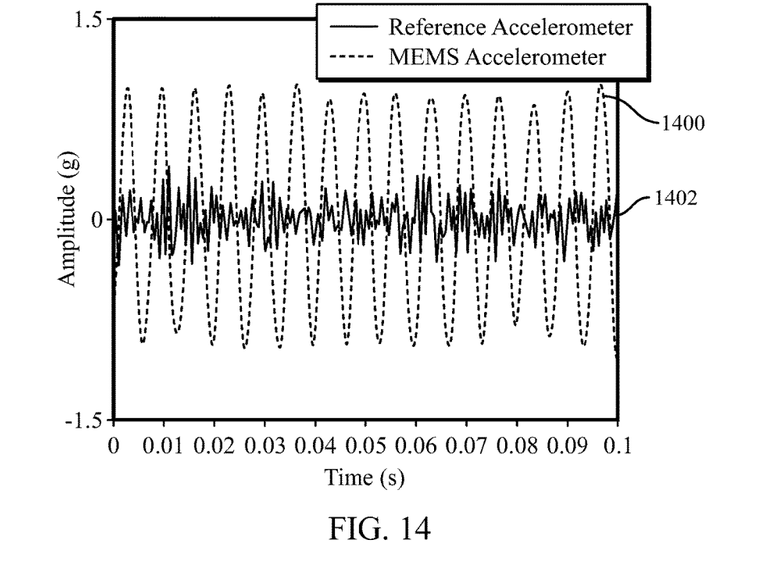
FIG. 14 is a plot of the time-series output of an example MEMS accelerometer and of a reference accelerometer.

We performed an experiment in which our MEMS accelerometer was subjected to a broadband signal containing a 160 Hz signal using a shaker. The MEMS accelerometer was tuned to resonate at a target frequency of 160 Hz. FIG. 14 is a plot of time-series output 1400 of the MEMS accelerometer and time-series output 1402 of a (non-frequency-selective) reference accelerometer. As is evident in the figure, the output from the reference accelerometer contains the full signature of the input excitation, whereas the MEMS accelerometer preferentially selects the target frequency.

Figure 15A:
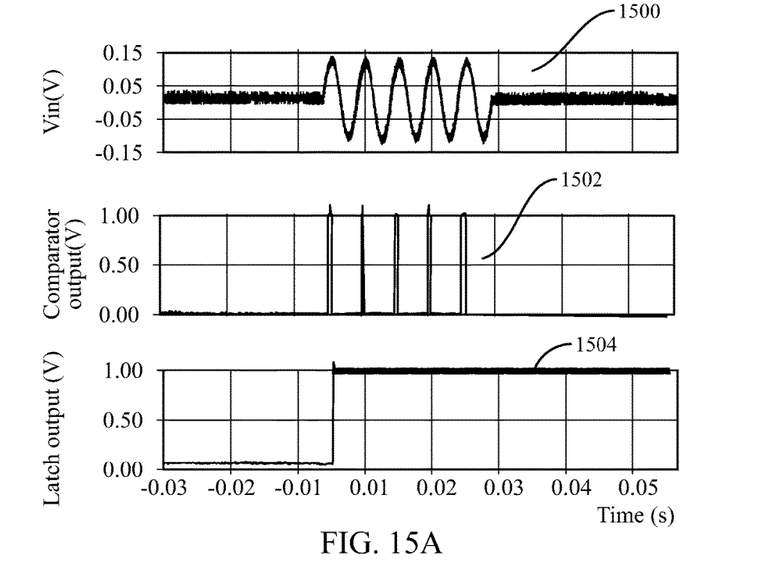
FIG. 15A is a graph of measured voltage input, comparator output, and latch output for an example accelerometer detector system.

FIG. 15A is a graph of measurements of voltage input 1500, comparator output 1502, and latch output 1504. These measurements demonstrate the operation of the comparator and latch.

As seen in the figure, an input 200 Hz sinusoid, biased at 0 V, causes the comparator to trip when it exceeds the threshold voltage. The latch holds its output at the high voltage from the first comparator trip until the latch is reset.

Figure 15B:
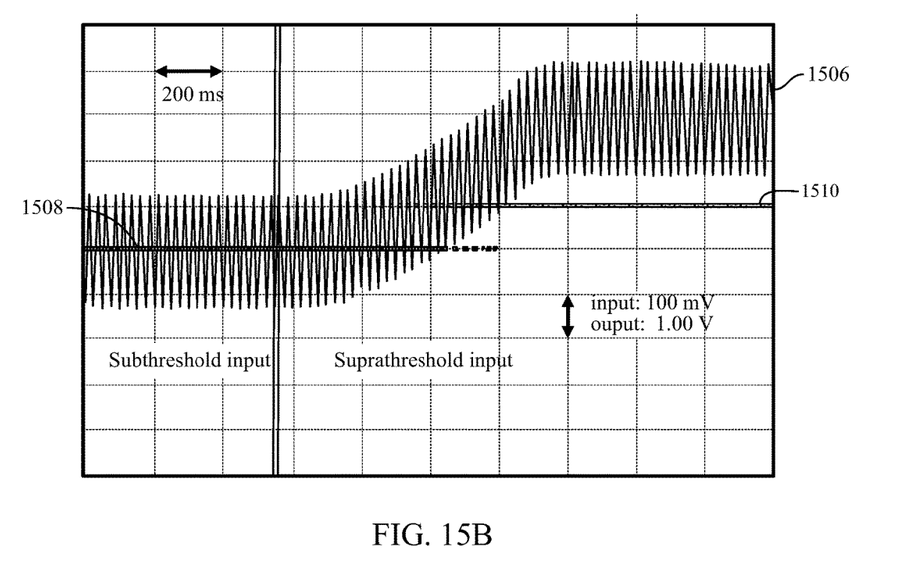
FIG. 15B is a graph of the input to a self-latching comparator circuit and the resulting output.

FIG. 15B is a graph of the input to a self-latching comparator circuit (as described below) and the resulting output. The input is a 40 Hz sinusoidal signal 1506 as measured at the comparator input node, downstream of the summing point for the feedback signal that latches the output. The bias on the input signal is initially at zero. However, about 560 ms after the beginning of the plot, the simulated sensor output is switched from a value below the comparator threshold of 100 mV to a value above the threshold. From there, it will be seen that the bias rises to a saturation value, and concurrently, the comparator output 1508 transitions to its high state 1510.

It will also be seen that several cycles are required for the comparator to fully latch. This is because the feedback charges up the capacitance at the input node at a finite rate.

The approximate power consumption of the components was as follows: the comparator 1.8 nW, the latch 0.9 nW, the bias cell 1.8 nW, and trip-point generation about 0.9 nW, for a total power consumption of about 5.4 nW. The power consumption was the same before and after tripping. The variation of the power consumption was within 20% as measured across three trial wafers.

One feature of our detector system is that the trip voltage of the comparator can be adjusted for a desired tradeoff between sensitivity to the target signal and the probability of false alarms.

In an experiment, the accelerometer was excited with an input signal representing a combination of target noise from a generator with background noise. A realistic reference level of total noise intensity was designated, and a reference level of background noise intensity was designated.

In one set of measurements, we chose a set of trip voltages. At each trip voltage, the input signal level (i.e., of target signal plus background noise) was stepped up from a small fraction of the total signal reference level until the wakeup was triggered. The wakeup input levels are plotted (as fractions of the total noise reference level 1×) on the vertical axis of FIG. 16.

Figure 16:
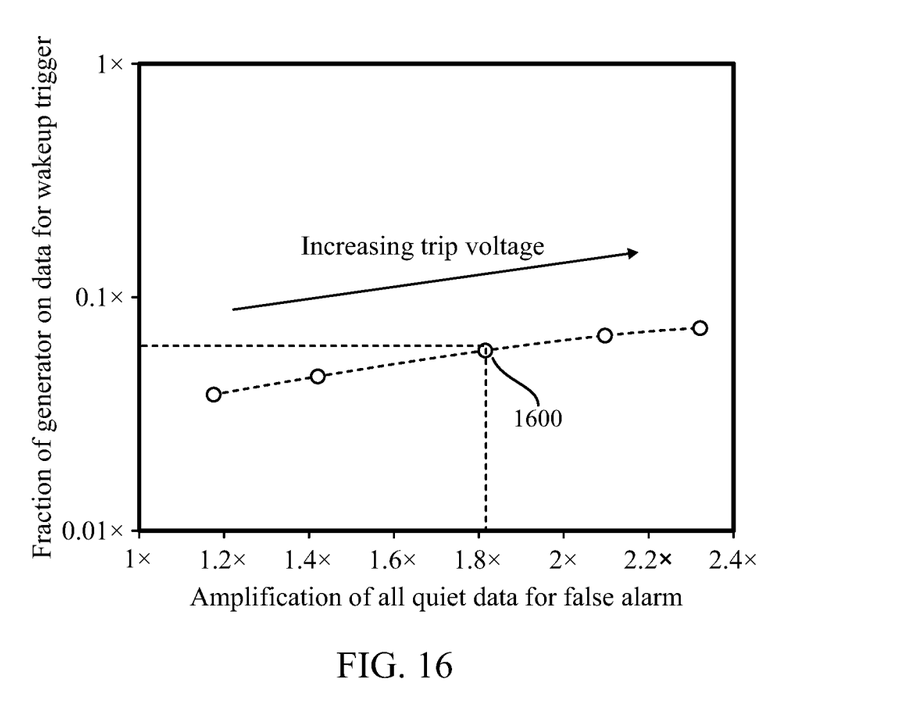
FIG. 16 is a graph in which each point represents a trip voltage for an example accelerometer detector. At each point, an indication of sensitivity to a target signal is plotted against an indication of the probability of false alarm.

A second set of measurements used the same set of trip voltages. At each trip voltage, the measured background noise (without the target noise) was stepped up from the background noise reference level until the wakeup was triggered. The wakeup input levels are plotted (as multiples of the background noise reference level 1×) on the horizontal axis of the figure.

Accordingly, each point plotted on the graph of FIG. 16 represents a respective trip voltage, with the wakeup level of total noise (indicating sensitivity to the target signal) plotted against the wakeup level of background noise (indicating probability of false alarm).

Thus, at a threshold of 100 mV, for example, our system woke up at only 6% of the 1× generator signal while rejecting false alarms until 180% of the 1× background noise level was reached. This is indicated at point 1600 of the graph.

Our studies showed that an accelerometer could be designed for a resonant response at least in the range from 50 Hz to 250 Hz. Designs that resonate as low as 25 Hz or even less, and as high as 1 kHz or even more, are also believed feasible through appropriate geometrical scaling.

In our experimental trials, we achieved sensitivities as high as 450 V/g with the resonant frequency of the accelerometer matched to a target excitation frequency of 97 Hz.

Example 3: Low-Power-Dissipation CMOS Circuitry

Figure 17:
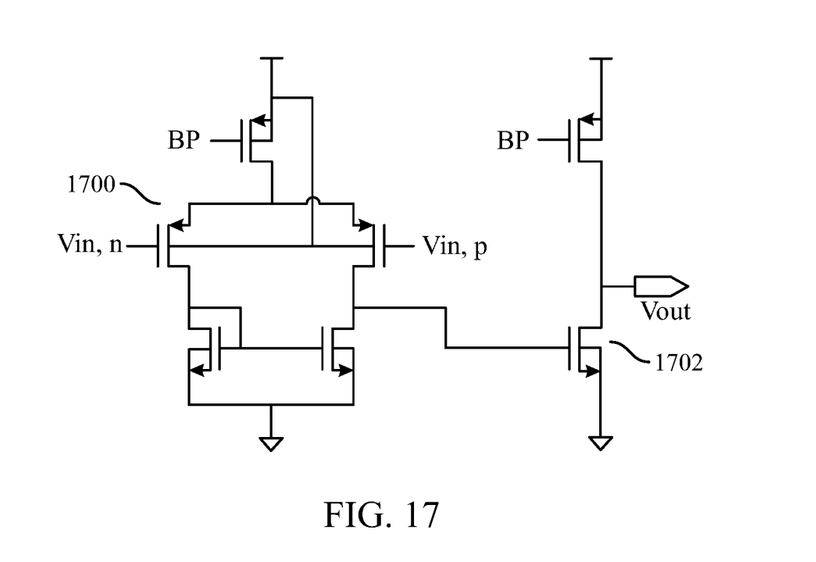
FIG. 17 is a notional circuit diagram of a CMOS circuit that forms the core of an example comparator suitable for use in the systems described here.

FIG. 17 is a notional circuit diagram of a CMOS circuit that forms the core of an example comparator suitable for use in the systems described here. The example circuit is constituted by a differential pair 1700 followed by a common-source amplifier 1702. To limit power consumption, the bias points (BP) can be set to the subthreshold regime so that the current in each branch of the circuit is limited to a current-starved state of less than 1 nA.

To further limit power consumption, long-channel transistors can be used. (In this regard, a transistor is "long-channel" if its channel length is at least ten times the gate width.) For example, the transistors with gate connections to the bias points in FIG. 17 may advantageously be long-channel transistors, and likewise the cross-connected transistors in FIG. 18.

Figure 18:
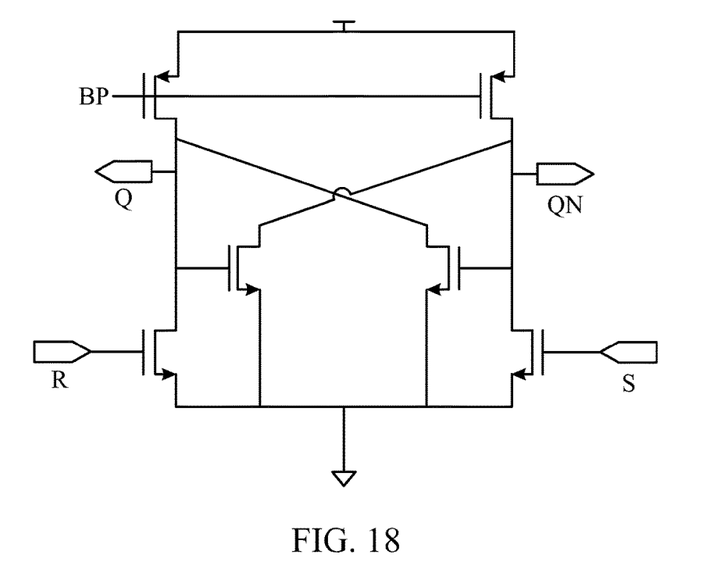
FIG. 18 is a notional circuit diagram of a cross-coupled latch circuit.

FIG. 18 is a notional circuit diagram of a cross-coupled latch circuit. To reduce power consumption, the bias point (BP) can be set for current starvation, as described above. The circuit can be designed so that in current-starved operation, it consumes 1 nW of power, with 1 nA of current flowing in one branch and no current flowing in the other, before and after latching.

Figure 19:
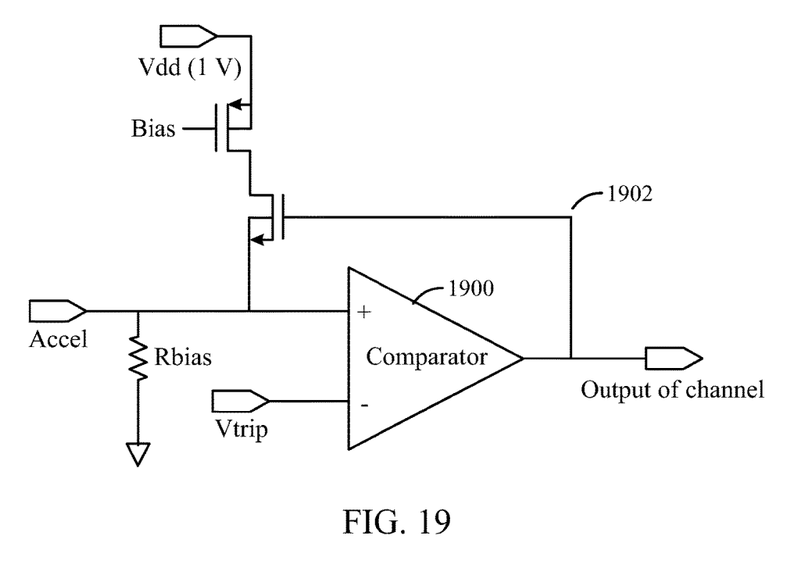
FIG. 19 is a notional circuit diagram of a topology for a self-latching comparator circuit.

FIG. 19 is a notional circuit diagram of a topology for a self-latching comparator circuit. In this circuit, there is no separate latching stage. Instead, latching is provided by adding a positive feedback loop to the comparator circuit 1900. The feedback path is seen as the line 1902 running from the output of the channel back to the gate of the transistor on the comparator non-inverting input. This latching arrangement operates with zero power consumption when unlatched and as little as 1 nW or less of power consumption while latched. We believe that this is an innovative use of positive feedback to replace what would otherwise be an entire circuit stage.

Multiple-Channel Topologies

Figure 20:
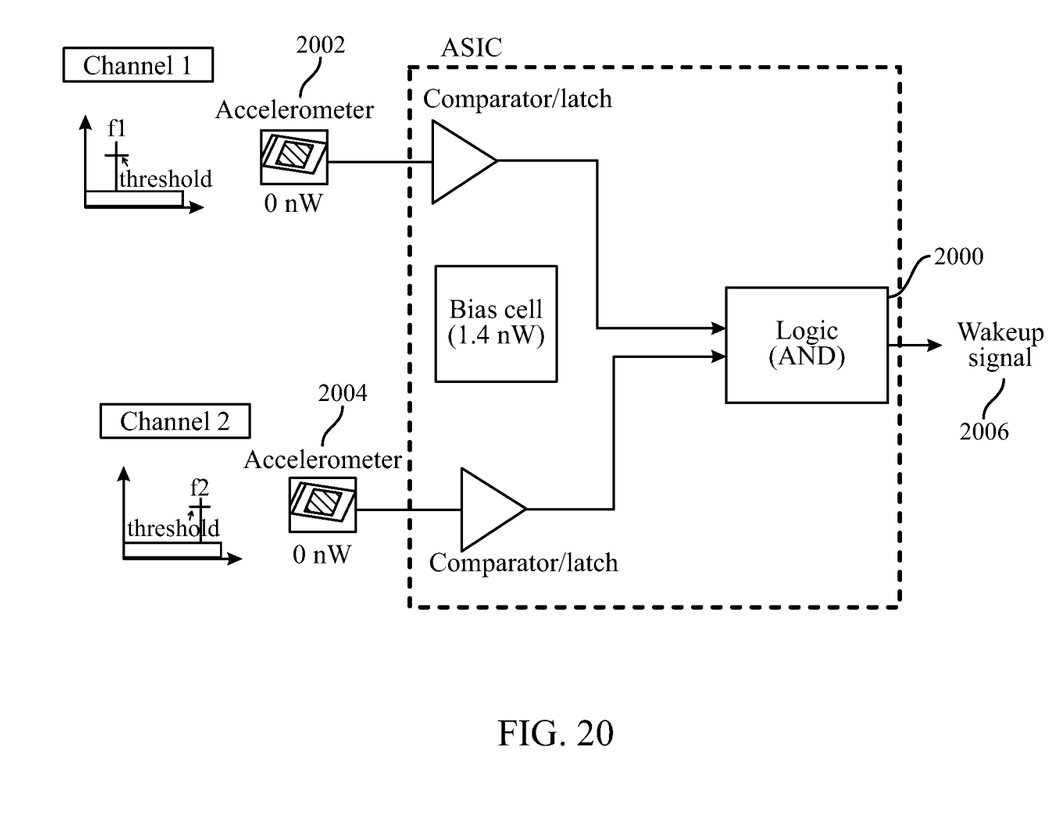
FIG. 20 illustrates the use of a logic gate to combine the outputs from two sensors having different resonant frequencies and possibly also different wakeup thresholds.

The wake-up signals from multiple sensors can be logically combined to produce output having more information than the output for a single sensor. For example, FIG. 20 illustrates the use of a logic gate 2000 (illustratively an AND gate, although any other logical functions, including OR, NAND, and NOR will also be useful in this context) to combine the outputs from two sensors 2002, 2004 having different resonant frequencies and possibly also different wakeup thresholds. The same idea is readily extended to any logical combination of the outputs from any number of sensors. Accordingly, the net response 2006 can be tailored, for example, to a complex target spectrum or to a group of target spectra. The net response can likewise be tailored to be non-responsive when specified spectral patterns are present.

Multiple sensors are readily integrated on a single CMOS chip together with their comparator and latching circuits and the logic circuits. Greater economy both in power dissipation and in real estate can be achieved by sharing a common bias cell among two or more channels.

Figure 21:
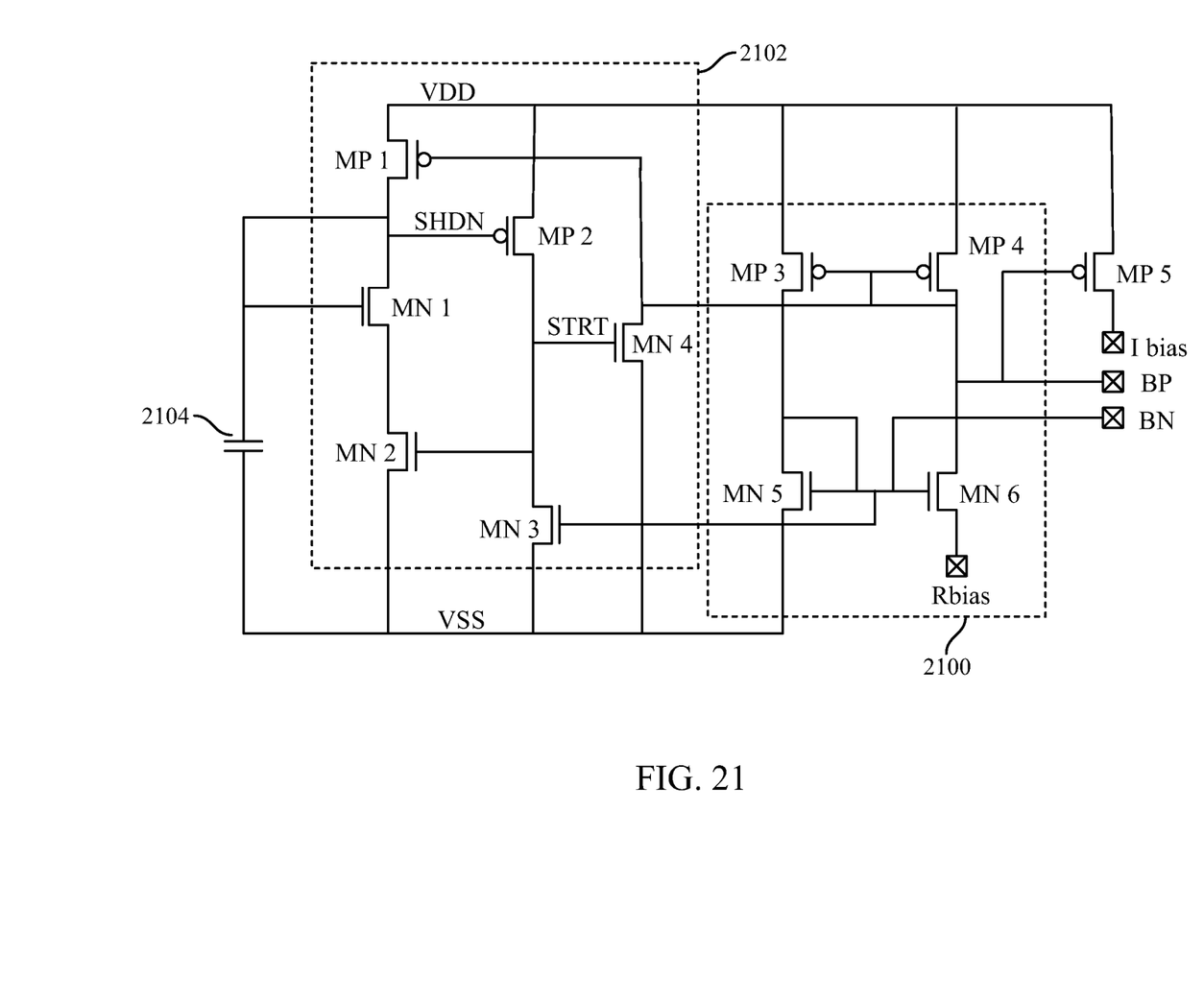
FIG. 21 is a simplified circuit diagram for an example circuit that can usefully serve as the primary bias circuit for the various low-power circuits that are described here.

FIG. 21 is a simplified circuit diagram for an example circuit that can usefully serve as the primary bias circuit for all low-power circuits discussed above. The circuit of FIG. 21 produces a bias current of about 1 nanoampere (i.e., 1 nA) out of node Ibias. It also creates bias voltages BN and BP for NMOS and PMOS current mirrors respectively. These bias voltages are used to bias current-mirror devices in other circuits to achieve a controlled current of about 1 nA in those circuits.

The core bias cell 2100, which is made up of transistors MP3, MP4, MN5, and MN6, is a well-known bootstrap architecture. However, our bias cell differs from a standard bootstrap bias cell in that the four transistors listed above are long-channel devices that are forced to operate in the sub-threshold region by a large external resistor, having a resistance greater than 50 MΩ, that is connected to Rbias.

The startup circuit 2102, made of devices MP1, MP2, MN1, MN4, MN2, and MN3, is designed to shut off after the bias cell has started up properly. This is advantageous for achieving ultra-low power. The startup circuit draws power only upon power-up, and then it shuts off as soon as the bias voltages BP and BN reach their destined values.

The startup circuit operates on the assumption that VDD is initially at 0V and that the capacitor 2104 connected to the gate of MP2 is at 0V. The transistors MP2, MP1, and MN4 are initially at low impedance, thus allowing the capacitor to charge. This state forces BP to a voltage less than VDD, and it forces BN to a voltage higher than 0V. As the capacitor charges, all current paths in the startup circuit are cut off, leaving the bias cell in an operating state that consumes less than about 2 nA. Even lower currents can be achieved by increasing the resistance of the external bias resistor.

We claim:

1. Apparatus comprising:
   a resonant MEMS device; and
   an integrated circuit electrically connected to the resonant MEMS device;
   wherein:
   the resonant MEMS device comprises a mass element suspended solely by flexures from a substrate;
   each of the flexures comprises a piezoelectric layer;
   the flexures are electrically connected to the integrated circuit such that in use, mechanically induced voltages in the flexures are coupled as input to the integrated circuit; and
   the integrated circuit comprises a comparator-latch circuit that produces a latched output voltage in response to an input signal that exceeds a threshold.

2. The apparatus of claim 1, wherein each of the tethers comprises a piezoelectric aluminum nitride layer overlying a layer of structural material.

3. The apparatus of claim 1, wherein each of the tethers comprises a piezoelectric aluminum nitride layer overlying a structural layer of single-crystalline silicon.

4. The apparatus of claim 1, wherein:
   the resonant MEMS device is conformed as a microphone in which the mass element is a diaphragm suspended by the flexures over a back cavity;
   the flexures are conformed to permit out-of-plane vibration of the suspended diaphragm; and
   the suspended diaphragm has a resonant frequency of vibration that lies within an operating frequency range of the apparatus.

5. The apparatus of claim 4, wherein the flexures are arranged circumferentially around the diaphragm, and wherein a vent is defined between each sequential pair of flexures.

6. The apparatus of claim 5, wherein the diaphragm is mass-loaded to reduce the resonant frequency.

7. The apparatus of claim 6, wherein the diaphragm is mass-loaded, at least in part, with additive material.

8. The apparatus of claim 1, wherein:
   the resonant MEMS device is conformed as an accelerometer in which the mass element is a suspended proof mass;
   the flexures are conformed to permit in-plane vibration of the suspended proof mass; and
   the suspended proof mass has a resonant frequency of vibration.

9. The apparatus of claim 8, wherein each of the flexures is folded at least twice.

10. The apparatus of claim 1, wherein the comparator-latch circuit comprises a comparator having an input, an output, and a positive feedback loop that latches the comparator by feeding the output back to the input.

11. The apparatus of claim 1, wherein the comparator-latch circuit comprises a plurality of long-channel CMOS transistors.

12. The apparatus of claim 1, wherein the resonant MEMS device is unpowered.

13. The apparatus of claim 1, wherein the resonant MEMS device and the integrated circuit constitute one of a plurality of sensor units, each of the sensor units has a latched output, and the latched outputs of the sensor units are combined in a logic circuit.

* * * * *